United States Patent Office 3,344,086
Patented Sept. 26, 1967

3,344,086
METHOD FOR REMOVING AMMONIA FROM AN AMMONIUM ZEOLITE
Robert H. Cramer, Belmont, Mass., and Abbott F. Houser, Cherry Hill Township, Middlesex County, and Kenneth I. Jagel, Jr., Mantua Township, Gloucester County, N.J., assignors to Mobil Oil Corporation, a corporation of New York
No Drawing. Filed Feb. 21, 1963, Ser. No. 260,333
6 Claims. (Cl. 252—452)

This invention relates to an improvement in the manufacture of inorganic oxide gels characterized by high diffusivity and high resistance to attrition.

In particular, the invention is directed to improvement in the handling strength of such gels and gel composites finding use as adsorbents, desiccants, catalysts, catalyst supports, carriers and in various other applications where rigidity and ability to withstand abrasion upon handling are considered desirable attributes.

More specifically, the present invention is concerned with an improved process for manufacturing an attrition resistant catalyst comprising an inorganic oxide gel matrix having contained therein finely divided insoluble material, which catalyst during the course of its manufacture has undergone treatment with a medium containing ammonium ions and subsequently heated to a temperature sufficient to release gaseous ammonia therefrom but below the fusion point of said material.

Modern catalytic processes require catalysts which are not only specifically active in the chemical reactions which are to be catalyzed but also possess physical characteristics required for successful commercial operation. One of the outstanding physical attributes of a commercial catalyst is hardness, i.e. the ability to resist attrition. The ability of a particle to hold its shape in withstanding the mechanical handling to which it is subjected upon storage, shipment and use is a primary requirement for a successful catalyst and for modern catalytic processes.

Thus, many operations for the conversion of hydrocarbon materials are carried out in the presence of inorganic oxide gels which themselves have a catalytic effect or which are impregnated with or act as a support for other catalytic material of a nature appropriate to the result desired. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous gel catalyst, having the ability to withstand abrasion during the necessary handling involved during continual conversion and regeneration is definitely desirable in overcoming the aforementioned disadvantages.

Likewise, in those instances where advantage is taken of the adsorbent or desiccant characteristics of inorganic oxide gels, it is highly desirable to employ a gel having the ability to resist attrition and thereby obviate contamination of the material undergoing treatment with gel fines. This is particularly the case where desiccant gel particles are tumbled or otherwise agitated in direct contact with the material being treated.

Another important physical attribute of gel composites and particularly modern-day hydrocarbon conversion catalysts is their diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly highly desirable to increase carbon burning capacity by improving the carbon burning rate for the spent catalysts.

It has heretofore been known that the attribution resistance and diffusivity of inorganic oxide gels may be increased by inclusion therein of controlled quantities of insoluble finely divided solids of predetermined particle size. Thus, inorganic oxide gels with unusual resistance to attrition have been prepared by incorporating in an inorganic oxide sol, a quantity of solid powdered material insoluble in the sol. The powder-containing inorganic oxide sol sets to a hydrogel after lapse of a suitable period of time and the resulting hydrogel is thereafter dried to a gel at a temperature below the fusion point of the incorporated powder. The gel product so obtained has a distinctly greater resistance to attribution than comparable gel which does not contain such added powder.

It is also well known that zeolitic metals contained in the precursor gel product, i.e. either in the hydrogel matrix or in the finely divided solid contained in such matrix, may be replaced by ion exchange with various other metals, ammonium or hydrogen ions. Thus, where a siliceous gel product is intended for use in catalytic cracking of hydrocarbon oils to lighter material boiling in the gasoline range, the intermediate hydrogel is ordinarily subjected to a base exchange treatment to remove zeolitic alkali metal introduced into the hydrogel through the use of an alkali metal silicate reactant. Also, in those instances where an alkali metal-containing solid is initially embodied in an inorganic oxide gel, it is desirable to remove or reduce the content of such alkali metal by base exchange with other ions.

When attempts have been made to replace exchangeable metal contained in inorganic oxide gel composites of the type above described, with ammonium ions and subsequently drying the exchanged product under conditions such that the ammonia released exceeds a minimum concentration in the adjacent atmosphere, it has been found that the resulting product instead of possessing the desired high resistance to attrition is in fact characterized by a very significantly reduced attrition resistance.

It has been established that such unexpected reduction in attrition resistance is attributable to prolonged contact of the released gaseous ammonia with the gel composite. It would appear that the presence of gaseous ammonia adversely affects the structure of the gel composite. Thus, if excessive amounts of ammonia contact the gel composite, the attrition resistant properties thereof are significantly reduced to a point where it is not feasible to employ such composite in those systems such as a commercial catalytic cracking operation, wherein the ability of a particle form catalyst to hold its shape in withstanding the mechanical handling to which it is subjected is a necessary requirement.

In accordance with the present invention, it has been discovered that if the gaseous ammonia released during the drying step is removed from contact with the gel product before the concentration thereof in the atmosphere adjacent said product exceeds an amount which will adversely affect the structure thereof, such product does possess the desired physical attribute of exceptional resistance to breakage and the resulting product does have the requisite hardness satisfactory for commercial use. Removal of gaseous ammonia produced during the drying step from contact with the gel composite is suitably accomplished by sweeping gaseous ammonia from the atmosphere in the immediate vicinity of the gel product with an inert gas or by withdrawing the released gaseous ammonia through an exhaust outlet.

Inorganic oxide gel composites generally wherein exchangeable metal has been replaced with ammonium ions and the product subsequently heated under conditions such that gaseous ammonia is released therefrom, are improved with regard to hardness characteristics by the method of this invention. Thus, gels of silica, alumina, molybdena, magnesia, chromia, zirconia, thoria, titania, manganese oxide and composites thereof may be rendered more resistant to attrition by the technique described herein. The gels so prepared may comprise a single inorganic oxide or may be cogels of two or more inorganic oxides. Preferred are cogels of silica and an oxide of at least one metal selected from the group consisting of groups II-A, III-B and IV-A of the Periodic Table. Such composites include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of a siliceous gel matrix utilized in the composite described herein will generally be within the approximate range of 55 to 100 weight percent with the metal oxide content ranging from zero to 45 weight percent.

The particular physical form of the gel composite will be determined principally by the use to which it is to be subjected. Thus, the hydrosol containing added powder may be permitted to set in mass to a hydrogel which is thereafter treated with a medium containing ammonium ions, dried with concurrent removal of released gaseous ammonia and broken into pieces of desired size. The pieces so obtained are generally of irregular shape. Uniformly shaped pieces of gel may be obtained by extrusion or pelleting of the powder containing hydrogel. Also, the hydrosol may be introduced into the perforations of a perforated plate and retained therein until the sol has set to a hydrogel, after which the formed hydrogel pieces are removed from the plate. The method of the invention is especially useful as applied to the manufacture of spherically shape gel particles produced by introducing drops of hydrosol into a water-immiscible liquid wherein the hydrosol sets to spheroidal bead-like particles of hydrogel. Larger size spheres are ordinarily within the range of from about 1/64 to about 1/4 inch in diameter, whereas smaller size spheres which are generally referred to as microspheres, are within the range of from about 10 to about 100 microns in diameter. The use of spherically shaped particles is of particular advantage as catalysts in hydrocarbon conversion processes, including the moving catalyst bed process, the fluidized process, etc. in which the spheroidal gel particles are subjected to continuous movement. As applied to the stationary bed, spheroidal gel catalyst particles provide effective contact between the reactants and the catalyst by avoiding channeling.

In accordance with the process of the invention, an inorganic oxide hydrosol is prepared containing between about 2 and about 90 percent by weight and more usually, particularly where the composite is prepared in the form of spheroidal particles, between about 3 and about 50 percent by weight of a powdered solid insoluble in the sol having a weight mean particle diameter of less than 10 microns, generally between 2 and 7 microns and preferably between 3 and 5 microns. The powdered material may be added by dispersing in an already prepared hydrosol or, as is preferable where the hydrosol is characterized by a short time of gelation, the powder may be added to one or more of the reactants used in forming the hydrosol or may be admixed in the form of a separate stream with streams of the hydrosol-forming reactants in a mixing nozzle or other means where the reactants are brought into intimate contact. The powder may also be introduced into the hydrosol by the formation in situ of a finely divided precipitate in one or more of the reactant streams by contacting appropriate chemicals either dissolved in reactant streams or in separate streams. Likewise, a powder may be introduced into an already prepared hydrosol by dispersing therein materials which will form a finely divided precipitate. The latter methods in which a precipitate is formed in the hydrosol or in recatants used in preparation thereof have generally not been found to be as desirable as the addition of powder, which has been previously ground to the requisite particle size and thereafter introduced into the hydrosol or during the course of hydrosol formation.

The powered or finely divided solid incorporated in the hydrosol should necessarily be insoluble therein and should further be characterized by being infusible at the hydrogel drying temperature. The hydrosol containing finely divided solid sets, after lapse of a suitable interval of time, to a hydrogel composite, characterized by the presence of exchangeable metal ions. Following the teachings of this invention, the hydrogel composite is treated with a medium containing ammonium ion under conditions such that exchangeable metal ions are replaced with ammonium ions. The exchange medium containing ammonium ions is generally a solution of a soluble ammonium salt such as ammonium chloride, ammonium sulfate and the like.

After base exchange is effected, the hydrogel product is dried at a temperature sufficient to release gaseous ammonia from the composite but below the fusion point of the added solid. The gaseous ammonia released is, following the teachings of this invention, removed from contact with the dried gel product before the concentration thereof in the atmosphere adjacent said product exceeds an amount which will adversely affect the gel structure. In general, it is preferred to maintain the concentration of ammonia in the atmosphere adjacent the gel product below about 12 volume percent, preferably below 8 volume percent and particularly below about 1 volume percent. An especially preferred method of operation is to effect immediate removal of the gaseous ammonia as it is released from contact with the gel undergoing drying. During drying the hydrogel undergoes considerable shrinkage. The extent of drying will depend somewhat on the use which it is desired to make of the product, but in any event, the drying is carried to a stage beyond that at which maximum shrinkage of the gel is obtained. The temperature of drying the hydrogel composite is generally in the range of about 150° F. to about 600° F. until shrinkage of the hydrogel is substantially complete. Generally, the desired extent of drying is accomplished in about 2 to about 48 hours.

To impart maximum attrition resistance to the gel product, it is further usually desirable to subject the dried composite to calcination in inert gas, air, stream or mixtures thereof at a temperature below that at which sintering is encountered and generally in the approximate range of 1150° F. to 1400° F. for a period of about 1 hour or more, generally from about 1 to about 48 hours.

The finely divided solid intimately combined with inorganic oxide hydrogel in accordance with the present invention may comprise a wide variety of materials insoluble in hydrosol or resulting hydrogel and infusible at the temperature of drying the hydrogel and the temperature of calcination where such latter treatment is employed. Suitable representative materials include dried gels or gelatinous precipitates, such as those of silica, alumina, magnesia, chromia, molybdena, zirconia, thoria, titania and the like including composites thereof. Other suitable materials are sand, clay, graphite, carbon black, metals and a wide variety of metal salts.

It is desirable, in some instances, to include a dispersing agent in the hydrosol containing dispersed powdered material. It has been found that with the use of such agents, the tendency of the powdered material to agglomerate is prevented. The dispersing agent may be added to the hydrosol in any feasible manner, for example, by adding to the solid material to be incorporated in the hydrosol prior to grinding thereof or during grinding to the requisite particle size. Alternatively, the dispersing agent may be added to the hydrosol containing powdered material before the same sets to a hydrogel or the dispersing agent may be introduced with one of the reactant solutions used to form the hydrosol. The dispersing agent employed may be either of the ionic or non-ionic type. Typical suitable dispersing agents include ethylene oxide polymers, ethylene oxide-alkyl phenol polymers, fatty acid soaps, such as the alkali metal salts of such fatty acids as oleic, linoleic, stearic, linolenic, and palmitic acids, alkyl sulfonate salts, inorganic and organic acids, gum arabic, sodium hexametaphosphate, lecithin, aralkyl sulfonates, alkylated phenol sulfonates, sodium pyrophosphate, partial esters of polyhydroxyalcohols, salts of lignin sulfonic acid, tannic acid, sodium silicate, and the like. The quantity of dispersing agent required is generally very small. As little as .01 percent by weight may be used and, generally, the quantity employed does not exceed about 1 percent by weight. The particular amount of dispersing agent introduced into the hydrosol will depend upon the quantity and surface area of the powdered material present and upon the characteristics of such material.

The powdered material incorporated in the hydrosol is suitably prepared by grinding or ball-milling such material with or without added water to the requisite particle size. During such operation the aforementioned dispersing agents may be added to facilitate break-down and deflocculation of the material.

It is desirable, as indicated hereinabove, that the finished gel product have a high diffusivity. The diffusivity of a porous solid is a measure of the ability of fluids to diffuse therethough and is determined by measuring the rate at which hydrogen under a constant partial pressure, at essentially atmospheric conditions, will pass through a single particle having a size of 5 to 6 mesh (Tyler). The diffusivity is the average of such determinations on fifteen particles and is expressed as cubic centimeters of hydrogen per centimeter of solid per second $\times 10^{-3}$. The gel composite described herein is desirably characterized by a diffusivity determined on the above basis in excess of 5 and generally within the range of 8 to 50.

A preferred embodiment of the invention involves an improvement in a method for the manufacture of a hydrocarbon conversion catalyst characterized by high resistance to attrition, high diffusivity, high activity and exceptional selectivity in which a finely divided crystalline aluminosilicate is contained in and distributed throughout an inorganic oxide gel matrix. The resulting gel composite containing exchangeable metal ions and generally zeolitic alkali metal where an alkali metal silicate has been employed in making a siliceous gel matrix is contacted with an ammonium ion-containing medium to replace such exchangeable alkali metal at least in part with ammonium ions. Thus, the presence of alkali metal and particularly sodium in a hydrocarbon conversion catalyst is highly undesirable, reducing the yield of desired conversion products and giving rise to unwanted sintering of the gel composite catalyst when exposed to high temperatures. In reducing the content of such undesirable exchangeable metal in the gel composite catalyst, the latter is contacted with an ammonium-containing solution. After replacement of the exchangeable metal with ammonium ions, the composite is suitably washed free of water-soluble material and dried under temperature conditions which effect release of gaseous ammonia from the exchanged composite. The amount of gaseous ammonia released will of course depend on the extent of ammonium ions previously introduced into the composite. As a practical matter in manufacture of a gel composite cracking catalyst, generally an excessive amount of gaseous ammonia is released from the composite during the drying operation.

As described above, it is highly beneficial to replace alkali metal ions and particularly sodium ions of the composite catalyst with ammonium ions, but it has been found that the presence of ammonia in the form of a gas is exceptionally detrimental to the structure of the gel composite. If excessive amounts of ammonia contact the catalyst composite, attrition resistant properties thereof have been found to be significantly reduced to the point where it is not feasible to use the catalyst composite in a commercial hydrocarbon conversion process.

It has been discovered that if the gaseous ammonia released in and during the drying operation is removed in a manner to avoid any substantial buildup of concentration of gaseous ammonia in the drying atmosphere in contact with the precursor gel catalyst, the resulting product, after thermal activation, provides not only a high conversion activity but also possesses exceptional physical properties of good hardness and resistance to breakage.

The aluminosilicates employed in making the above catalyst are frequently referred to as zeolites. These materials are essentially the dehydrated forms of crystalline aluminosilicates containing varying quantities of metals such as alkali, alkaline earth and rare earth with or without other metals. Such metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities are precisely uniform in size. The metal aluminosilicates used in the process of this invention have a uniform pore structure comprising openings characterized by an effective pore diameter in excess of 6 Angstrom units and generally between 6 and 15 Angstrom units.

Typical aluminosilicates which can be used to prepare the catalyst of this process include the alkali metal aluminosilicates, prepared following the general procedure described in U.S. 2,882,244, Belgium 577,642, Belgium 598,582 and the like. Other metal aluminosilicates can be prepared by base exchanging the crystalline alkali metal aluminosilicate with a solution containing ions capable of replacing alkali metal. The base-exchange operation is carried out for a sufficient period of time and under appropriate temperature conditions to substatntially reduce the alkali metal content of the aluminosilicate and preferably to replace at least about 90 percent of the alkali metal originally contained in the aluminosilicate. It is contemplated that any ionizable compound of a metal capable of replacing the alkali metal may be employed for base exchange alone or in combination with other ions. Compounds can be used wherein the replacing ion is in the cationic state. Inorganic salts will usually be employed. Suitable materials include soluble compounds of calcium, magnesium, manganese, vanadium, chromium, cerium, aluminum, lanthanum, praseodymium, neodymium, samarium, yttrium, and other rare earths and mixtures of the same with other ions, such as ammonium. Organic salts of the foregoing metals, such as acetate and formate may also be used as well as very dilute or weak acids.

The finely divided aluminosilicates which are admixed with the inorganic oxide sol should have a weight mean particle diameter of less than about 10 microns, preferably between 2 and 7 microns and more preferably between 3 and 5 microns. The use of finely divided material having a weight mean particle diameter in excess of 10 microns gives rise to a physically weak product while the use of fines having a weight mean particle diameter of less than 1 micron produced a product of low diffusivity.

Intimate admixture of the ingredients of the catalyst can be conducted by dispersing the finely divided aluminosilicate in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means, where the reactants are brought into intimate contact.

The inorganic oxide sol serves in its gel form as a matrix for the crystalline aluminosilicate powder distributed therein. While sol used to prepare silica gel may be utilized as a suitable matrix, it is preferred that the siliceous hydrosol employed be a sol which on gelation will provide a cogel of silica and an oxide of at least one metal selected from the group consisting of metals of groups II–A, III–B, and IV–A of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. Particular preference is accorded cogels of silicia-alumina, silica-zirconia, and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hydrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc.

If desired, additional fines may be added to the aluminosilicate-inorganic oxide sol to improve physical properties of the finished catalyst which includes improved attrition resistance of the catalyst composite. Suitable fines which can be added include among others, alumina, quartz, barium sulfate or barytes, bauxite, clay, zircon and the like. Additional fines which can be added are the fines of the suitable cracking catalysts such as aluminosilicate-inorganic oxide gel catalysts, prepared by the process of this invention including silica-alumina, silica-zirconia, silica-alumina-zirconia, rare earth aluminosilicate-siliceous oxide, rare earth aluminosilicate-silicate-alumina, and the like. It is desirable, however, that the finely divided material added to the hydrosol not contain any materials which adversely affect the hydrocarbon conversion process. For example, the presence of various metals such as nickel, vanadium, iron, sodium, and the like are known to adversely affect operations involving the cracking of hydrocarbon oils. The amounts of such additional fines which can be added to the catalyst composite to improve the physical properties can range from about 5 to about 50 weight percent based on the finished catalyst composite.

After the aluminosilicate-inorganic oxide slurry is formed, gelation of the resulting sol is effected by the addition thereto of an acidic solution which can contain one or more metal salts as described above, the oxides of such metals being cogelled with silica. The acidic solutions used in gelation can include sulfuric acid, hydrochloric acid, nitric acid, acetic acid and the like in which is mixed one or more metal salts such as aluminum sulfate, aluminum chloride, aluminum nitrate, zirconium sulfate, titanium tetrachloride, magnesium sulfate, chromium sulfate, and the like.

After forming, the composite product is base exchanged with an ammonium-containing medium such as an aqueous ammonium-containing solution generally characterized by a pH in excess of about 2, preferably by a pH in the range of 5 to 10. The base-exchange step is necessary to remove the substantial amount of sodium or other alkali metal contained in the composite product, such as for example, zeolitic alkali metal originating from the use of alkali metal silicate used to prepare the gel.

It is contemplated that an ammonium-containing solution wherein ammonium ions alone predominate of a combination of ammonium ions and other metals capable of replacing the alkali metal in the catalyst composite may be employed for base exchange. If the aluminosilicate portion of the catalyst composite has been previously base-exchanged to substantially remove the alkali content prior to the combination of the aluminosilicate with the inorganic oxide matrix, the use of a suitable ammonium-containing solution alone such as ammonium chloride, ammonium sulfate, and the like is highly desirable. If additional metals are desirably added to the composite such as rare earth metals, calcium, magnesium and the like, these metal cations in combination with an ammonium-containing solution can be used as the base-exchange medium. Additionally, the ammonium-containing solution alone can be initially used as the base-exchange medium followed by a suitable metal cation to complete the base exchange. If the alkali metal aluminosilicate is utilized to prepare the gel, the base-exchange step is conducted with metals in the cationic state such as the soluble compounds including calcium, magnesium, manganese, vanadium, chromium, cerium, aluminum, lanthanum, praseodymium, neodymium, samarium, yttrium and other rare earths in mixture with ammonium ions. The use of ammonium ions in the base-exchange step is essential for removing substantially all of the alkali metal in the gel composite because of the ease with which ammonium ions replace sodium ions to significantly increase the rate of base exchange which is an important economic factor. The low cost of the ammonium solutions is another economic advantage. In any event, the base-exchange step is conducted to remove substantially all of the alkali metal in the gel composite. It is preferred to remove the sodium content of the gel composite until an amount of sodium of the composite, on a dry basis, is at least below about 4 weight percent, preferably below about 2 weight percent and more preferably below about 0.5 weight percent.

While water will ordinarily be the solvent in the base-exchange solutions used, it is contemplated that other solvents, although generally less preferred, may be used. Thus, in addition to aqueous solutions, alcoholic solutions, etc. of suitable compounds as noted above, may be employed in producing the catalyst utilized in the present process. It will be understood that the compounds employed for the base-exchange solution undergo ionization in the particular solvent used.

The concentration of compound employed in the base-exchange solution may vary depending on the nature of the particular compound used, on the metal aluminosilicate undergoing treatment and on the conditions under which treatment is effected. The overall concentration of the replacing ion, however, is such as to substantially reduce the alkali metal content of the alkali-containing metal aluminosilicate composite. Generally, the concentration of compound, the cation of which replaces alkali metal from the metal aluminosilicate composite, is within the range of 0.2 to 30 percent by weight, although as noted hereinabove, other solution concentrations may be employed.

The temperature at which base exchange is effected may vary widely, generally ranging from room temperature to an elevated temperature below the boiling point of the treating solution. While the volume of base-exchange solution employed may vary widely, generally an excess is employed and such excess is removed from contact with the crystalline alumino-silicate after a suitable period of contact. The time of contact between the base-exchange solution and crystalline aluminosilicate in any instance in successive contacts is such as to effect replacement of the alkali metal ions thereof to an extent such that the alkali metal content of the composite after undergoing base exchange is less than about 4 percent by weight. It will be appreciated that such period of contact may vary widely depending on the temperature of the solution, the nature of the alkali metal aluminosilicate used, and the particular compound employed for base exchange. Thus, the time of contact may extend from a brief period of the order of a few hours for small particles to longer periods of the order of days for large pellets.

After the base-exchange treatment, the product containing ammonium ions is removed from the treating solution. Anions introduced as a result of treating with the base-exchange solution are removed by water wahing the treated composite for such period of time, until the same is free of said anions. The washed product is then thermally dried, generally in superheated steam to remove substantially all of the water therefrom. The drying procedure is feasibly conducted at a temperature in the range from about 150 to about 600° F. for 2 to 48 hours.

During the drying procedure, a substantial amount of gaseous ammonia is released from the catalyst composite. The equipment conveniently used in the drying step is a conventional continuous moving belt containing the catalyst composite in particle form passing through an oven separated by various compartments to maintain the desired heat in the oven. As the gaseous ammonia is released in this equipment, substantial amounts of ammonia are trapped and contact the catalyst composite which is being dried. As beneficial as the use of ammonium ions are in the base-exchange operation, and without being limited to any theory, the presence of gaseous ammonia in contact with the catalyst composite appears unexpectedly to attack the gel to produce a weakened structure of the composite, i.e. to reduce significantly the attrition resistance properties to the point where the physical properties of the resulting catalyst composite are unsuitable for commercial use. A small amount of gaseous ammonia in contact with the gel structure can be tolerated, such as amounts below about 1 and preferably below about 0.5 volume percent in the surrounding atmosphere without serious detrimental effects. In particular it is desired to avoid any type of contact of the ammonia gas with the gel structure. Where the amounts of the contacted gaseous ammonia exceed 0.5 volume percent up to about 8 volume percent, the physical properties of the composite are affected more so than the lower amounts of ammonia contact, but the resulting catalyst composites generally are found acceptable for commercial use. At amounts of ammonia contact exceeding about 8 and particularly in excess of 12 volume percent, the physical properties of the resulting catalyst composite are generally not acceptable for commercial use.

To avoid excessive contact of the catalyst composite with gaseous ammonia, various procedures can be utilized to remove or disperse this undesirable gas. Thus, small vents may be installed in the appropriate compartments of the oven to immediately remove the released ammonia gas. In addition to the use of vents, the use of reduced pressure or suction communicating with said vents can be utilized. Another method of preventing substantial contact of the ammonia gas with the catalyst composite, is to disperse or dilute the ammonia concentration by the injection of an inert gas such as steam, air, nitrogen, and the like to remove or to reduce the concentration of the ammonia gas. The methods of removal or dispersal of the ammonia gas are not necessarily critital but it is essential for purposes of this invention that substantial contact of the gaseous ammonia with the composite catalyst be avoided or reduced to a predetermined minimum.

The dried material is then subjected to an activating treatment essential to render the composition catalytically active. Such treatment entails heating the dried material in an atmosphere which does not adversely affect the catalyst such as steam, air, nitrogen, hydrogen, flue gas, helium or other inert gas. Generally, the dried material is heated in air, steam or mixtures thereof to a temperature in the approximate range of 500° F. to 1500° F. for a period of at least about 1 hour and usually between 1 and 48 hours. The finished catalyst product generally has a surface area, within the approximate range of 100 to 700 square meters per gram.

It has further been found that catalystic selectively of the above-described composition is greatly improved by subjecting the same to a mild steam treatment, where the catalyst has not previously been exposed to such atmosphere. Exposure of the catalyst to steam is a highly desirable step in obtaining a product capable of affording an enhanced yield of gasoline. Steam treatment may be carried out at a temperature within the approximate range of 800° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 5 percent by volume, but containing air or other gas substantially inert with respect to the composite being treated may be used and such mixtures may, in some instances, be desirable with the use of the more elevated temperatures to avoid possible deactivation of the catalyst. The above-mentioned steam treatment serves to convert a substantial portion of the crystallinity of the original aluminosilicate to non-crystalline or amorphous material. It is thus a particular embodiment of the invention that at least about 25 percent and preferably at least 50 percent of the original crystallinity possessed by the aluminosilicate structure be converted to amorphous material to achieve a resulting catalyst product of optimum cracking characteristics.

Cracking, utilizing the catalyst produced by the process described herein, may be carried out at catalytic cracking conditions employing a temperature within the approximate range of 700° F. to 1200° F. and under a pressure ranging from sub-atmospheric pressure up to several hundred atmospheres. The contact time of the oil within the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fixed bed or as a compact particle-form moving bed.

The cracking activity of the catalyst is a measure of its capacity to catalyze conversion of hydrocarbons and is expressed herein as the percentage conversion of a Mid-Continent Gas Oil having a boiling range of 450 to 950° F. to gasoline having an end point of 410° F. by passing vapors of the said gas oil through the catalyst at 875° F., substantially atmospheric pressure and a feed rate of 1.5–7.5 volumes of liquid oil per volume of catalyst per hour for ten minute runs between regenerations.

The attrition characteristics of the gels prepared in accordance with the method described herein were determined by an attrition test known as the Lauson Shaker Attrition (LSA) test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce a 10 weight percent fines capable of passing through an 8-mesh (Tyler) screen, the sample is screened, weighed, and the percent loss is calculated. These operations are repeated until slightly more than half the sample has been reduced to fines. Cumulative losses are plotted against total shaking time for each cycle. The cumulative time in seconds for 50 percent weight of fines is read from the curve and is reported as the Lauson Shaker Attrition. Since the Lauson Shaker Attrition of gels is affected by the size of the particles tested, the attrition data reported herein is corrected to correspond to an average particle diameter of 0.140 inch to avoid the interference of this variable in correlating the effect of quantity and size of added powdered material on attrition. The gel composites and catalysts prepared with the method described herein are characterized by an LSA attrition resistance of at least 1000 and preferably greater than 1500. A catalyst having having an LSA determination below 1000 is not considered to have satisfactory attrition resistance.

The following comparative examples serve to illustrate the advantages of the process of the present invention without limiting the same:

EXAMPLE 1

An ion exchange operation was carried out to produce crystalline rare earth aluminosilicate from a powdered crystalline sodium aluminosilicate having uniform pore openings between 6 and 15 Angstrom units. The sodium aluminosilicate was prepared according to the procedure of U.S. 2,882,244.

Three tanks were connected in series and the charge to each of the three contacting vessels was as follows:

| | Pounds |
|---|---|
| Rare earth chloride ($RECl_3 \cdot 6H_2O$) [1] | 7.7 |
| Water | 66.1 |
| Sodium aluminosilicate (47.3 weight percent water) | 54.4 |

[1] Typical analysis of rare earth chloride:

A salt of lignin sulfonic containing:

| | Weight percent |
|---|---|
| CaO | 3.8 |
| $Na_2O$ | 4.9 |
| MgO | [2] 1 |

[2] 26.5 grams (0.2% weight based on dry sodium aluminosilicate).

| | Weight percent |
|---|---|
| $CeCl_3 \cdot 6H_2O$ | 43.5 |
| $LaCl_3 \cdot 6H_2O$ | 23.0 |
| $NdCl_3 \cdot 6H_2O$ | 17.9 |
| $PrCl_3 \cdot 6H_2O$ | 5.4 |
| $SmCl_3 \cdot 6H_2O$ | 1.9 |
| $GdCl_3 \cdot 6H_2O$ | 0.6 |
| $YCl_3 \cdot 6H_2O$ and others | 0.2 |
| Impurities | 7.5 |

The charge was heated to 180° F. and held at this temperature for 45 minutes. At the end of 45 minutes, the addition of $RECl_3 \cdot 6H_2O$ solution to the first contacting stage was started at 2052 cc./min. with the overflow from the first tank going to the second, and the overflow from the third contacting stage going to a rotary filter and the solid discharge from the filter being returned to the first contacting stage. The temperature was maintained at 180° F. during the continuous addition, the addition was continued for 4½ hours. The flow rate of the $RECl_3 \cdot 6H_2O$ solution was adjusted to circulate the contents of the three contacting stages once every 45 minutes. The concentration of the $RECl_3 \cdot 6H_2O$ solution was 0.237 lb. $RECl_3 \cdot 6H_2O$/gal.

Conditions were selected to give 0.264 pound of $RECl_3 \cdot 6H_2O$ per pound of dry sodium aluminosilicate in the first 45-minute period of exchange and 0.066 pound of $RECl_3 \cdot 6H_2O$ per pound of dry sodium aluminosilicate in each of the six 45-minute subsequent periods of exchange. Over the complete exchange cycle 0.66 pound of $RECl_3 \cdot 6H_2O$/pound of dry sodium aluminosilicate was used.

A batch-type pilot unit ball mill was used to grind a slurry of 36 weight percent rare earth aluminosilicate, as prepared above containing 0.4 weight percent, based on the solids, of a dispersant composed of a salt of lignin sulfonic acid containing 11 weight percent $Na_2O$, 0.4 weight percent CaO, and 0.5 weight percent MgO. The ball mill which rotated at 42 revolutions per minute was approximately 16 inches inside diameter and 16 inches long (1.86 cubic feet volume). The apparent volume of the grinding medium (½ inch to ⅝ inch flint pebbles) was 40 percent of the mill volume and the volume occupied by the grinding medium plus the slurry was 50 percent of the mill volume. After grinding in this manner for 2 hours, the particle size characteristics were determined as follows:

Particle size data:
| | |
|---|---|
| Weight means particle diameter, microns | 4.1 |
| Surface mean particle diameter, microns | 2.7 |
| Percent >10 microns | 2 |
| Percent <2 microns | 14 |

Example 2

A crystalline rare earth aluminosilicate was prepared as in Example 1 having uniform pore openings in the range from 6 to 15 Angstrom units and a weight mean particle diameter of about 4.1 microns. The finely divided rare earth aluminosilicate was incorporated as an ingredient of the fines slurry into a silica-alumina gel resulting from admixture of the following solutions:

A. *Sodium silicate solution*

| | Pounds |
|---|---|
| Sodium silicate ($Na_2O/SiO_2 = 0.3/1$) | 54.7 |
| Water | 42.9 |
| Sodium hydroxide | 2.4 |

B. *Acid alum solution*

| | Pounds |
|---|---|
| Water | 90.9 |
| Aluminum sulfate | 5.8 |
| Sulfuric acid | 3.3 |

C. *Fine slurry*

| | Pounds |
|---|---|
| Water | 80.0 |
| Silica-alumina fines [3] | 13.9 |
| Rare earth aluminosilicate | 6.1 |

[3] Silica-alumina fines containing about 10% alumina and 90% silica (dry basis) having a weight mean particle diameter of 4.3 microns.

Solution A having a specific gravity 1.227 at 60° F., Solution B having a specific gravity 1.084 at 60° F., and Solution C having a specific gravity 1.142 at 60° F. were continuously mixed together through a nozzle using 328 cc. per minute of the silicate solution at 54° F., 385 cc. per minute of the acid alum solution at 54° F. and 92 cc. per minute of fines slurry at 54° F. The resulting hydrosol was formed into spheroidal hydrogel beads by introducing globules of the sol into an oil medium such as described in U.S. 2,384,946. The hydrosol particles so formed set to firm hydrogel beads in 5 seconds at a pH of 8.0 and a temperature of 64° F.

The gel beads were then treated with an aqueous ammonium sulfate solution to remove the oil film deposited on the gel. After the treatment, the gel beads were then base exchanged at room temperature with an aqueous solution containing 1.4 weight percent ammonium sulfate to remove substantially all of the available replaceable sodium ions and then washed with water until the effluent water was free of sulfate ions.

The washed gel beads were divided into two portions and dried under various conditions. The equipment used in the drying step was a conventional continuous moving belt containing the gel beads passing through an oven separated by various compartments to maintain the temperatures over an increasing range from about 270° F. to 350° F. In the drying step after substantial amounts of water have been removed from the beads, gaseous ammonia is then released. One portion of the beads was dried under conditions wherein no attempt was made to remove or disperse the ammonia (designated catalyst A). The other portion of the beads was dried under conditions wherein a stream of steam was passed into the oven in order to carry out the ammonia and also to dilute the amount of vailable ammonia below about 0.5 volume percent (designated catalyst B). The dried material was then subjected to a steam treatment using 80 percent steam at 1310° F. for about 16 hours at 0 p.s.i.g. The following physical properties of the resulting catalysts were obtained:

| Physical Properties | Catalyst A | Catalyst B |
| --- | --- | --- |
| Packed density, g./cc | 0.82 | 0.80 |
| Whole Beads, Percent | 70 | 95 |
| Attrition Resistance (LSA) | 350 | 1,870 |

As will be seen from the foregoing data, proper venting of ammonia from the dryer insured good physical properties in the resulting catalysts as evidenced by improved attrition resistance and whole bead yield.

*Example 3*

Sodium aluminosilicate having uniform pore openings from 6 to 15 Angstrom units and a weight mean particle diameter of about 4 microns was incorporated as an ingredient of the fines slurry into a silica-alumina gel resulting from admixture of the following solutions:

A. *Sodium silicate solution*

|   | Pounds |
| --- | --- |
| Sodium silicate ($Na_2O/SiO_2=0.3/1$) | 61.7 |
| Water | 36.3 |
| Sodium hydroxide | 2.0 |

B. *Acid alum solution*

|   | Pounds |
| --- | --- |
| Water | 91.4 |
| Aluminum sulfate | 5.8 |
| Sulfuric acid | 2.8 |

C. *Fines slurry*

|   | Pounds |
| --- | --- |
| Water | 74.0 |
| α Alumina [4] | 22.1 |
| Sodium aluminosilicate [4] | 3.9 |

[4] α alumina fines and sodium aluminosilicate were jet pulverized simultaneously and the size of the resulting size-reduced mixture was 4.2 microns weight mean particle diameter.

Solution A, having a specific gravity of 1.248 at 60° F., Solution B, having a specific gravity of 1.081 at 60° F., and Solution C, having a specific gravity of 1.236 at 60° F. were continuously mixed together through a nozzle using 310 cc. per minute of the silicate solution at 48° F., 383 cc. per minute of the acid alum solution at 48° F. and 152 cc. per minute of the fines slurry at 48° F. The resulting hydrosol was formed into spheroidal hydrogel beads by introducing globules of the sol into an oil medium such as described in U.S. 2,384,946. The hydrosol particles so formed set to firm hydrogel beads in 5 seconds at a pH of 8.0 and a temperature of 55° F.

The gel beads were then treated with an aqueous solution containing 2 weight percent rare earth chloride hexahydrate having the composition shown in Example 1 for 10 hours at room temperature. After this treatment, the gel beads were then base exchanged at room temperature with an aqueous solution containing 1.4 weight percent ammonium sulfate to remove substantially all of the replaceable sodium ions and then washed with water until the effluent water was free of sulfate ions.

The washed gel beads were divided into two portions and dried under various conditions. The equipment used in the drying step was a conventional continuous moving belt containing the gel beads passing through an oven separated by various compartments to maintain the temperatures over an increasing range from about 270° F. to 350° F. In the drying step after substantial amounts of water have been removed from the beads, gaseous ammonia was then released. One portion of the beads was dried under conditions wherein no attempt was made to remove or disperse the ammonia (designated catalyst S). The other portion of the beads was dried under conditions wherein a stream of steam was passed into the oven in order to carry out the ammonia and also to dilute the amount of available ammonia below about 0.5 volume percent (designated catalyst T). The dried material was then subjected to a steam treatment using 55 percent steam at 1325° F. for about 16 hours at 0 p.s.i.g. The following physical properties of the resulting catalysts were obtained:

| Physical Properties | Catalyst S | Catalyst T |
| --- | --- | --- |
| Packed density, g./cc | 0.93 | 0.91 |
| Whole beads, percent | 76 | 90 |
| Attrition Resistance, (LSA) | 240 | 1,290 |

Again, it will be evident that the catayst wherein released ammonia was removed from the drying zone was characterized by a higher whole bead yield and possessed a very substantially improved resistance to attrition as compared with like catalyst dried under conditions whereis the released ammonia was permitted to remain in contact with the catalyst.

It is to be understood that the foregoing description is merely illustrative of preferred embodiments of the invention of which many variations may be made by those skilled in the art within the scope of the following claims without departing from the spirit thereof.

We claim:

1. In a process for manufacturing an inorganic oxide gel composite characterized by high attrition resistance and diffusivity by dispersing in an inorganic oxide sol a finely divided solid insoluble therein, effecting gelation of said sol containing finely divided solid, replacing exchangeable metal in the resulting composite with ammonium ions and drying the resulting hydrogel at a temperature sufficient to release gaseous ammonia therefrom but below the fusion point of said solid, the improvement which comprises immediately removing released ammonia from contact with said composite before the concentration thereof in the surrounding atmosphere exceeds an amount having an adverse effect on the gel structure of said composite.

2. The process of claim 1 wherein said finely divided solid comprises a crystaline aluminosilicate.

3. In a process for manufacturing an inorganic oxide gel composite characterized by high attrition resistance and diffusivity by dispersing in an inorganic oxide sol a finely divided solid insoluble therein, effecting gelation of said sol containing finely divided solid, replacing exchangeable alkali metal in the resulting composite with ammonium ions and drying the resulting hydrogel at a temperature sufficient to release gaseous ammonia therefrom but below the fusion point of said solid, the improvement which comprises immediately sweeping said gaseous ammonia from contact with said composite in a stream of inert gas.

4. In a process for manufacturing a hydrocarbon conversion catalyst characterized by high attrition resistance, high diffusivity and high conversion activity by dispersing in an inorganic oxide sol a finely divided solid comprising a crystalline metal aluminosilicate having uniform pore openings in excess of about 6 Angstrom units, effecting gelation of said sol containing said solid, replacing exchangeable metal in the resulting composite with ammonium ions, washing the base exchanged material free of soluble matter, drying and thereafter thermally activating the resulting product by subjecting the same to a temperature in the approximate range of 500° F. to 1500° F., the improvement which comprises immediately removing gaseous ammonia released during said drying from contact with said composite before the concentration thereof and adjacent atmosphere exceeds an amount detrimental to the gel structure of said catalyst.

5. In a process for manufacturing a hydrocarbon conversion catalyst characterized by high attrition resistance, high diffusivity and high conversion activity by dispersing finely divided crystalline rare earth aluminosilicate having uniform pore openings in excess of about 6 Angstrom units and a weight mean particle diameter in the approximate range of 1 to 10 microns and another finely divided solid comprising fines of said catalyst in an inorganic oxide sol, effecting gelation of said sol, base exchanging the resulting product with an ammonium ion-containing solution, washing the base exchanged material free of soluble matter, drying and thereafter thermally activating the resulting product by subjecting the same to a temperature in the range from about 500° F. to about 1500° F., the improvement which comprises immediately removing gaseous ammonia released during said drying to avoid substantial contact thereof with said composite before the concentration thereof in the surrounding atmosphere exceeds approximately 12 volume percent.

6. In a process for manufacturing a hydrocarbon conversion catalyst characterized by high attrition resistance, high diffusivity and high conversion activity by dispersing in an inorganic oxide sol a finely divided solid comprising a crystalline alkali metal aluminosilicate having uniform pore openings in excess of about 6 Angstrom units, effecting gelation of said sol containing said finely divided solid, base exchanging the resulting product with rare earth metal ions and ammonium ions to reduce substantially the alkali metal content of the resulting product, washing the base exchanged product free of soluble matter, drying and thereafter thermally activating the resulting product by subjecting the same to a temperature in the approximate range of 500° F. to 1500° F., the improvement which comprises immediately removing the gaseous ammonia released during said drying from contact with said product before the concentration thereof in the surrounding atmosphere exceeds an amount having an adverse effect on the gel structure of said product.

References Cited
UNITED STATES PATENTS

| | | | |
|---|---|---|---|
| 3,140,252 | 7/1964 | Frilette et al. | 252—455 |
| 3,238,147 | 3/1966 | Cramer et al. | 252—254 |

OSCAR R. VERTIZ, *Primary Examiner.*

H. S. MILLER, *Assistant Examiner.*